(12) United States Patent
Jang

(10) Patent No.: US 6,516,133 B1
(45) Date of Patent: Feb. 4, 2003

(54) METHOD FOR BACKWARD REPRODUCTION IN A TIME-LAPSE VIDEO RECORDER

(75) Inventor: Soo Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/210,776

(22) Filed: Dec. 14, 1998

(30) Foreign Application Priority Data

Mar. 4, 1998 (KR) .............................................. 98-7177

(51) Int. Cl.$^7$ ................................................ H04N 5/91
(52) U.S. Cl. .......................................... 386/68; 386/81
(58) Field of Search ........................... 386/6–8, 68–70, 386/78–81; 360/72.1–74.1

(56) References Cited

U.S. PATENT DOCUMENTS

| | | | | |
|---|---|---|---|---|
| 4,688,115 A | * | 8/1987 | Takahashi et al. ............. | 360/70 |
| 5,140,435 A | * | 8/1992 | Suzuki et al. ............... | 360/72.1 |
| 5,396,378 A | * | 3/1995 | Yokoyama ................ | 360/77.14 |
| 5,481,413 A | * | 1/1996 | Kawada et al. ................ | 360/53 |
| 5,680,499 A | * | 10/1997 | Choi .......................... | 386/68 |
| 5,757,572 A | * | 5/1998 | Sasaki ........................ | 360/72.2 |
| 5,809,200 A | * | 9/1998 | Nishimoto et al. ........... | 386/46 |
| 5,970,204 A | * | 10/1999 | Higurashi .................... | 386/65 |
| 6,314,137 B1 | * | 11/2001 | Ono et al. ................... | 375/240 |

* cited by examiner

Primary Examiner—Andrew Christensen
Assistant Examiner—Polin Chieu
(74) Attorney, Agent, or Firm—Birch, Stewart, Kolasch & Birch, LLP

(57) ABSTRACT

A method for backward reproduction in a video tape recorder, includes the steps of detecting a position on a magnetic video tape where a video head contacts with the tape at the time when a backward reproduction instruction is inputted by the user, moving the tape in the reverse direction from the detected position, stopping the reverse movement of the tape immediately after a set amount of the tape, reproducing the video signal recorded on the tape while moving the tape in the forward direction, storing the reproduced video signal in the field memory after digitization, and generating a video signal by reading out stored video data from the field memory in the reverse sequence in which they have been stored as soon as the field memory becomes full. The present method allows review of high-quality images in backward reproduction of the recorded video signals using a simple servo control.

17 Claims, 3 Drawing Sheets

METHOD FOR BACKWARD REPRODUCTION IN A TIME-LAPSE VIDEO RECORDER

BACKGROUND OF THE INVENTION

1. Field of the Invention

The present invention relates generally to a method for backward reproduction in a time-lapse video tape recorder. More specifically, the present invention relates to a method for backward reproduction a in time-lapse video tape recorder for reviewing images of good quality from a previously recorded video signal frame by frame only with a simple servo control. The present backward reproduction method stores temporally video signals, which are reproduced while a magnetic tape is moved forward, in a memory and reading out them in a reverse order in which they have been stored.

2. Brief Description of the Related Art

Unlike an ordinary continuous video tape recorder which records every frame of video signals, a time-lapse video tape recorder intermittently records video signals from several video cameras or the like on a magnetic video tape with a pre-selected regular interval while the recorder repeats running and stopping of the tape. Such a device has been useful in various security sensitive places, e.g., banks and museums, because these places require long-time recording of several sites for security monitoring. As shown in FIG. 1, a conventional time-lapse video tape recorder comprises an A/D converter 100 streams, a buffer memory 201 in which the digital video data are stored temporarily; a field memory 202 in which the digital video data from the buffer memory 201 are stored before they are recorded, a D/A converter 300 which converts the digital video data stored in the field memory 202 into an analog video signal, a recording/reproduction unit 400 which records the analog video signal on the magnetic tape, and a controller 500 which controls writing/reading intervals of video signals from the external video cameras to/from memories 201 and 202 according to the instruction input through an input unit 600 from a user.

The recording/reproduction unit 400 comprises a video signal processing unit and mechanical elements, shown in FIGS. 1 and 2, such as a loading motor 401 which moves a loading post 1 to load/unload the magnetic tape 10; a drum motor 402 which rotates a head drum 3 on which video heads 2 are mounted to record/reproduce video signals on/from the magnetic tape 10; a capstan motor 403 which rotates a capstan shaft 4 to drive the magnetic tape 10 at a designated tape running speed.

In a conventional time-lapse video tape recorder configured as above, one frame is extracted from a continuous video signal that is received from an selected external video camera at a predetermined interval and is then stored temporarily in the buffer memory 202 via the A/D converter 100. Then, the video frames in the buffer memory 202 are transferred into the field memory 202. This way, a continuous video signal is compressed in time domain. The time compressed signal is a digital video signal which is sub-sampled by frame.

When the field memory 202 becomes fill with the extracted video frames, they are read out at a time under the control of the controller 500 and are then converted into an analog video signal by the D/A converter 300. Then, the analog video signal begins to be recorded on the tape 10 immediately after reloading the tape 10 that has been unloaded during a recording pause period in which no video signal is recorded.

While the video frames in the field memory 202 are recorded on the tape 10, new video frames are sampled intermittently from a continuous video signal received from the external video camera and stored in the buffer memory 201 temporarily. As soon as the recording of the video frames in the field memory 202 is completed, the video frames, which have been stored in the buffer memory 201 for the recording operation, are transferred to the field memory 202, along with video frames which are newly stored in the buffer memory 201 after the completion of the recording operation. Whether or not the video frames are to be stored in the buffer memory 201 after the completion of recording operation depends on the storage capacity of the buffer memory 201.

After recording the video frames intermittently as above, when a user inputs a backward reproduction instruction to review the video signal previously recorded on the tape 10 in a reverse order, the video signal is reproduced in the reverse direction, field by field (or frame by frame), based on a control pulse (e.g., a pulse signal of 30 Hz) recorded in a control track along a lower part of the tape 10, as shown FIG. 3, while the tape 10 is being moved backward by the capstan motor 403.

In the explained conventional method for backward reproduction, however, because control pulses are read out during the reverse movement of the tape, the detected level of the control pulses decreases so that a complex servo control is needed to accurately reverse the tape one by one field (or one by one frame). Moreover, since the control pulses are recorded on the lower line track of the tape, if a little distortion of the tape occurs during the reverse movement, it is difficult to extract the control signal accurately, leading to difficulty in precisely locating each of video tracks on the tape during the time of backward reproduction, and control noise and beat noise may lower the quality of the reproduced video signal.

SUMMARY OF THE INVENTION

Accordingly, an object of the present invention is to solve the above mentioned problems and other problems of conventional methods and to provide a method for backward reproduction in a time-lapse video tape recorder that makes it possible to review in reverse the high-quality video signal that was previously recorded on a magnetic tape field by field (or frame by frame) through a simple servo control.

According to the present invention, a method for backward reproduction in a video tape recorder having a memory, includes the steps of identifying a current position of a tape; moving the tape in reverse for a predetermined distance from the identified position; reproducing a video signal recorded on the tape while moving the tape in the forward direction after the moving step; storing the reproduced video signal in the memory of a recording device in digital form according to a storage order; and retrieving digital video data stored in the memory in a reverse order of the storage order.

Further, a method for backward reproducing video information recorded on a recording medium, according to the present invention includes the steps of first moving a recording tape in a backward direction from a current position for a predetermined distance; second moving the recording tape in a forward direction after the first moving step; reproducing video signals from the recording tape during the second moving step; storing a digital form of the reproduced signals in a memory of a reproduction apparatus according to a storage order; and outputting the stored digital signals from the memory according to a reverse order of the storage order.

In the method for backward reproduction according to the present invention, when the backward reproduction instruction is entered by a user, instead of just reproducing recorded video signal while moving the tape in reverse, the position of the tape at which the video head is contacting at that time is determined by reading the position identification number that has been superimposed within a particular period of the video signal and then has been recorded on the tape. Then, the tape is moved in the backward direction by an amount, which is dependent on the storage capacity of the memory. After that, while running the tape in the forward direction, the video signal is reproduced and stored in the memory through digitization. Thus, the backward reproduction of the previously recorded video signal is done by reading out and reproducing the video signal from the memory in the reverse order in which it has been stored.

Unlike the conventional method for backward reproducing of video signal based on control signal on the tape, because the method according to the present invention retrieves digital video signal that has been reproduced while the tape moves in the forward direction, it offers better quality of video images and requires less complex servo control than the conventional method. Furthermore, it enables us to review images of good quality in backward reproducing mode without control noise or beat noise from the previously recorded video signal field by field (or frame by frame).

The above objectives, features, and advantages of the present invention will become apparent from the following detailed description of illustrative embodiments thereof to read in conjunction with the accompanying drawings.

BRIEF DESCRIPTION OF THE DRAWINGS

The accompanying drawings, which are included to provide a further understanding of the invention, illustrate a preferred embodiment of this invention, and together with the description, serve to explain the principles of the present invention.

In the drawings.

DETAILED DESCRIPTION OF THE PREFERRED EMBODIMENTS

Figure 1:
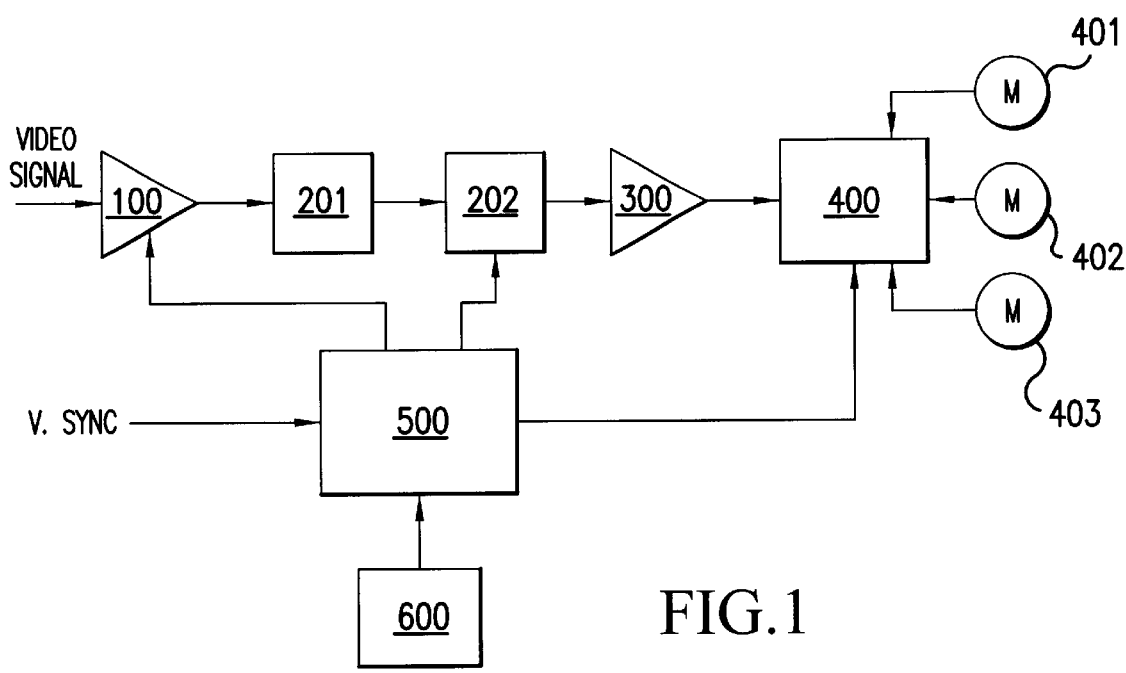
FIG. 1 shows a general block diagram of a conventional time-lapse video tape recorder.
Figure 2:
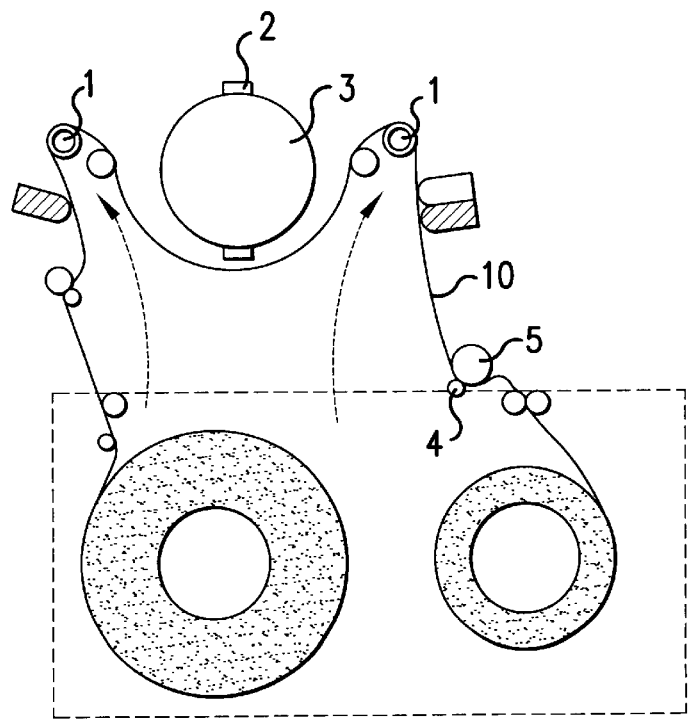
FIG. 2 shows a diagrammatic view of the recording/reproduction unit of the time-lapse video tape recorder of FIG. 1.
Figure 5:
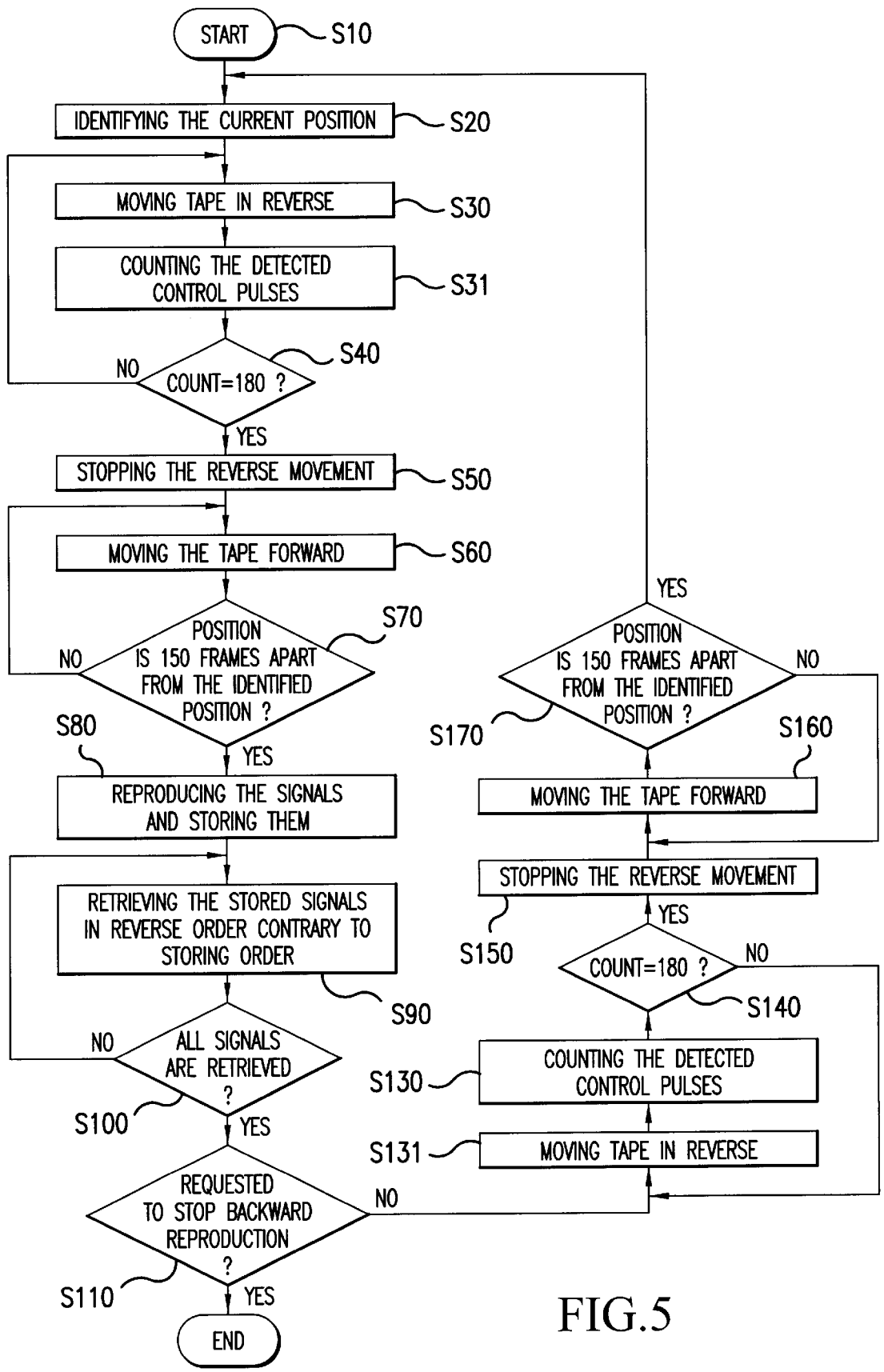
FIG. 5 is a flow chart of a method for backward reproduction in a time-lapse video tape recorder according to the present invention.

A method for backward reproduction in a time-lapse video tape recorder according to an embodiment of the present invention is described below in detail with reference to schematic diagrams shown in FIGS. 1 and 2 and the flow chart of FIG. 5.

Figure 4:
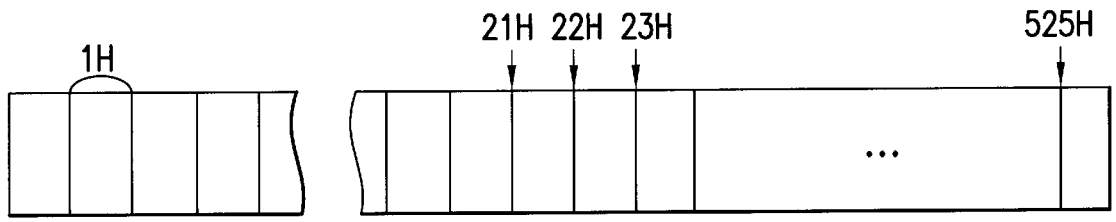
FIG. 4 is a diagram showing a period of a video signal in which a position identification number is superimposed.

Once the field memory 202 becomes full with video frames, e.g., 150 frames, the stored frames are retrieved under control of the controller 500 and are then recorded on the tape 10 by the recording/reproduction unit 400 after they are converted into an analog signal through the D/A converter 300. In the above recording operation, a position identification number (PIN) is inserted in a predetermined signal region, for example 21H to 23H (a 'H' represents one horizontal period) of each video signal, as shown in FIG. 4, prior to recording in order to identify each video field of the tape 10. Then, the video signal with a correspondent PIN is recorded by the recording/reproduction unit 400 under the control of the controller 500 on the video track of the tape 10.

When a backward reproduction instruction is entered by a user through the key pad or input unit 600, the controller 500 memorizes the current point at which the video head contacts the tape by referring to a position identification number PIN recorded at that point (S20). And then, it makes the capstan motor 403 to rotate in the reverse direction so that the tape moves in reverse for a predetermined distant from the memorized point (S30). The amount of the reverse movement of the tape is chosen such that it is larger than the storage capacity of the field memory 202 by about 30 frames, that is, the amount of the reverse movement becomes about 180 frames (=storage capacity of 150 frames+marginal 30 frames). Although 30 marginal frames are used, a different number of frames can be used for this purpose. The control pulses on the tape are counted by the controller 500 while the tape moves backward (S31), and the controller 500 keeps on checking whether or not the counted value becomes equal to the predetermined amount corresponding to 180 frames (S40). At the time when the counted value equals the preset amount, the controller 500 stops the reverse movement of the tape immediately (S50) and moves the tape in the forward direction by driving the capstan motor 403 (S60).

Figure 3:
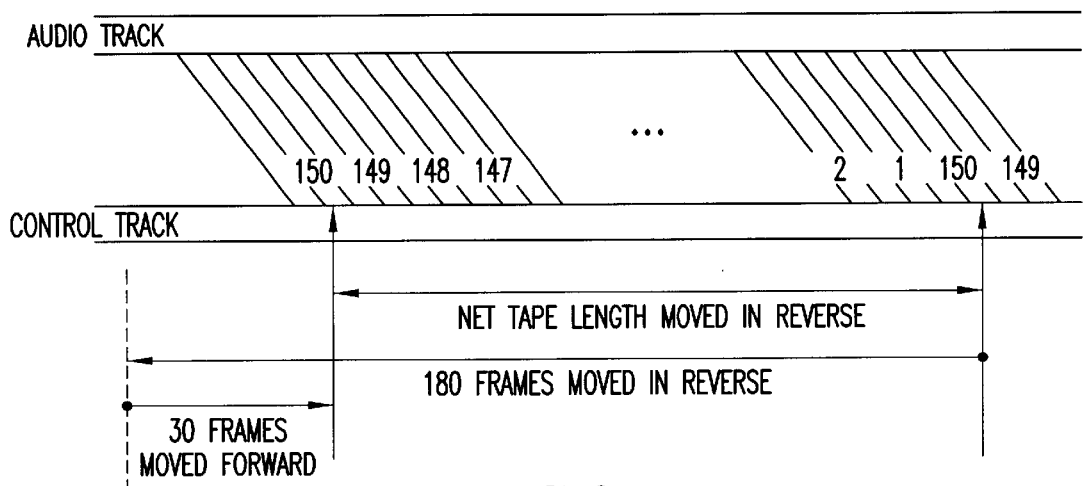
FIG. 3 shows an example of a signal recorded format of a magnetic video tape according to the present invention.

While the tape runs in the forward direction, the controller 500 reads the position identification number, i.e., field identification number which has been recorded in each of video fields reproduced from the tape in the recording/reproduction unit 400, and checks if the field identification number being read is less than the field identification number memorized at the start time of the backward reproduction operation by 150 frames (S70). When the difference between them becomes to be correspondent to 150 frames as shown in FIG. 3 (e.g., about 30 frames have passed in the forward movement), the video signal recorded on the tape starts to be reproduced from that point on the tape by the recording/reproduction unit 400. The reproduced video signal is digitized by the A/D converter 300 and, in turn, stored in the field memory 202 (S80).

Once the field memory 202 becomes full with the digital video frames, the 150 frames stored in the field memory 202 start to be retrieved in the reverse order in which they have been stored (S90) until all of 150 frames are retrieved in the reverse order (S100). That is, for example, if frames numbers 1–3 are stored in that order, the field memory 202 is read in the reverse order so that frames 3, 2, and 1 are output in that order for backward reproduction. Then, it is checked whether or not a backward reproduction stop instruction is inputted by the user (S110). If the stop instruction is not inputted or if the user intends to continue reviewing in reverse the previously recorded video frames, the above-explained procedure is repeated after moving the tape back again by an amount of 150 frames by performing the same steps of S30 to S70 as in steps S130 to S170.

According to the backward reproduction of the present invention, the backward reproduction is carried out by reproducing recorded video signals during the forward movement of the tape, and showing them in the reverse direction on an external display device since the video frames stored in the field memory 202 are retrieved in the reverse order in which they were stored, and the video frames are converted into composite video signal in retrieving sequence.

The foregoing is provided only for the purpose of illustration and explanation of the preferred embodiment of the present invention, so changes, variations and modifications may be made without departing from the spirit and scope of the invention.

What is claimed is:

1. A method for backward reproduction in a video tape recorder having a memory, comprising the steps of:

identifying a current position of a tape;

moving the tape in reverse for a predetermined distance from the identified position;

reproducing a video signal recorded on the tape while moving the tape in the forward direction after said moving step;

storing the reproduced video signal in the memory of the video tape recorder in digital form according to a reproduced order from the tape; and sequentially retrieving digital video data stored in the memory in a reverse order of the reproduced order in said storing step.

2. A method according to claim 1, wherein said identifying step detects the current position of the tape by detecting a position identification number that is superimposed within a particular period of a video signal recorded on the tape.

3. A method according to claim 1, wherein in said moving step, the predetermined distance of the tape depends on the storage capacity of the memory.

4. A method according to claim 1, wherein in said moving step, the predetermined distance corresponds to 180 frames.

5. A method according to claim 1, wherein said reproducing step includes the steps of:

forwardly moving the tape after said moving step for a preset distance; and reproducing the video signal recorded on the tape after said forwardly moving step.

6. A method according to claim 5, wherein in said forwardly moving step, the preset distance corresponds to 30 frames.

7. A method according to claim 1, further comprising:

displaying the retrieved digital video data for backward display.

8. A method according to claim 1, wherein said moving step includes the steps of:

stopping the tape after moving the tape in reverse for the predetermined distance; and detecting a position on the tape that coincides with a requested distance while moving the tape in the forward direction from the stopped position.

9. A method according to claim 8, wherein said stopping step includes the steps of:

counting a number of control pulses recorded on a control track of the tape;

comparing the count value with a reference value; and stopping the tape moving in reverse based on a result from said comparing step.

10. A method according to claim 1, wherein said retrieving step includes the steps of:

outputting the digital video data from the memory in the reverse order; and calculating an amount of the remaining digital video data in the memory during said outputting step to determine whether to backward reproduce the remaining digital video data.

11. A method according to claim 1, wherein in said storing step, the video tape recorder is a time-lapse video cassette recorder.

12. A method for backward reproducing video information recorded on a recording medium, comprising the steps of:

first moving a recording medium in a backward direction from a current position for a predetermined distance;

second moving the recording medium in a forward direction after said first moving step;

reproducing video information from the recording medium during said second moving step;

storing a digital form of the reproduced information in a memory of a reproduction apparatus according to a reproduced order; and sequentially outputting the stored digital information from the memory according to a reverse order of the reproduced order in said storing step.

13. A method according to claim 12, wherein in said first moving step, the predetermined distance corresponds to a predetermined number of frames.

14. A method .according to claim 12, wherein said first moving step includes:

counting control pulses recorded on the recording medium as the recording medium is moved in the backward direction; and comparing the count value with a reference value to move the recording medium for the predetermined distance.

15. A method according to claim 12, wherein in said first moving step, the recording medium is a magnetic tape.

16. A method according to claim 12, further comprising:

displaying the digital information output from said outputting step for backward display.

17. A method for backward reproduction in a recording device having a memory, comprising the steps of:

identifying a current position of a recording medium;

moving the recording medium in reverse for a predetermined distance from the identified position;

reproducing video information recorded on the recording medium while moving the recording medium in the forward direction after said moving step;

storing the reproduced information in the memory of the recording device in digital form according to a reproduced order from the recording medium; and sequentially retrieving digital video information stored in the memory in a reverse order of the reproduced order in said storing step.

* * * * *